United States Patent

[11] 3,589,467

[72] Inventor  Donald C. Swendsrud
               849 Oriole Drive, Rosemount, Minn. 55068
[21] Appl. No. 835,042
[22] Filed     June 20, 1969
[45] Patented  June 29, 1971

[54] AIR CUSHION VEHICLE
     2 Claims, 4 Drawing Figs.
[52] U.S. Cl. .................................................. 180/117,
                                                              180/120
[51] Int. Cl. .................................................. B60v 1/14
[50] Field of Search .......................................... 180/117,
                                                              118, 120

[56] References Cited
     UNITED STATES PATENTS
     2,968,453  1/1961  Bright................................ 180/117 UX
     3,065,935  11/1962 Dubbury et al. ................... 180/120 X
     3,177,959  4/1965  Gaska................................ 180/120
     3,268,022  8/1966  Gustafson........................... 180/120 X Primary Examiner—A. Harry Levy
Attorney—Thomas J. Nikolai ABSTRACT: An air cushion supported vehicle whose direction of motion is controlled by a set of vanes arranged in a grid to deflect the air produced by a motor driven fan is described. The positioning of the vanes in the grid is accomplished by the operator's control lever located within the operator's compartment.

PATENTED JUN29 1971 3,589,467

INVENTOR
DONALD C. SWENDSRUD
BY Thomas J. Nikolai
ATTORNEY

INVENTOR
DONALD C. SWENDSRUD
BY Thomas K. Nikolai
ATTORNEY

AIR CUSHION VEHICLE

BACKGROUND OF THE INVENTION

Various types of air cushion vehicles, i.e. vehicles designed to be supported by a cushion of air trapped between the base of the vehicle and the surface of the earth, are known in the art. In general, these vehicles are comprised of a plenum or air chamber in which a motor driven fan is employed to increase the air pressure in the volume defined by the plenum and the earth. To steer the vehicle, separate propellers, rudders or vanes may be employed.

The present invention is considered to be an improvement over prior art machines. Specifically, the present invention provides an improved steering control mechanism which affords a high degree of mobility, is simple to operate, and is of low cost construction, yet extremely reliable. The steering mechanism of this invention comprises first and second sets of parallel vanes arranged in a perpendicular grid pattern with a control device therefor which permits the operator to deflect either one or both of the sets of vanes through the use of a single control lever. By deflecting the vanes, the direction of airflow escaping from the plenum is controlled to propel the vehicle in any desired course.

It is accordingly an object of this invention to provide new and improved steering system for an air supported vehicle which affords excellent maneuverability, but which is simple in construction and highly reliable.

DESCRIPTION OF THE DRAWING

In the accompanying drawing in which like characters of reference designate like components in the several views.

DETAILED DESCRIPTION OF PREFERRED EMBODIMENT

Figure 1:
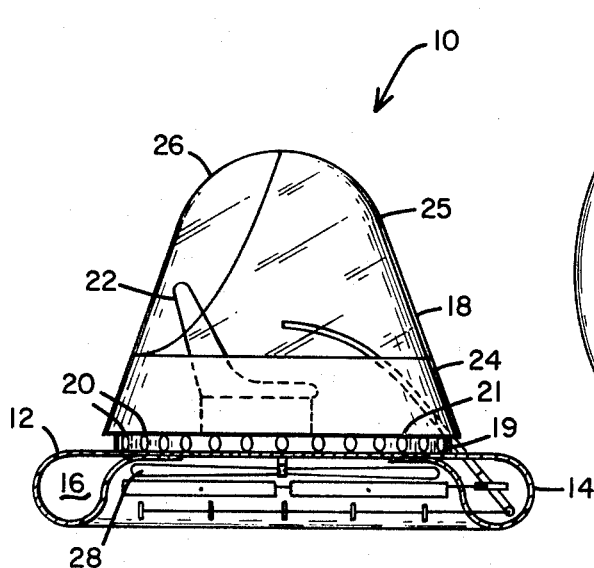
FIG. 1 is a side elevation of the vehicle utilizing my invention.
Figure 2:
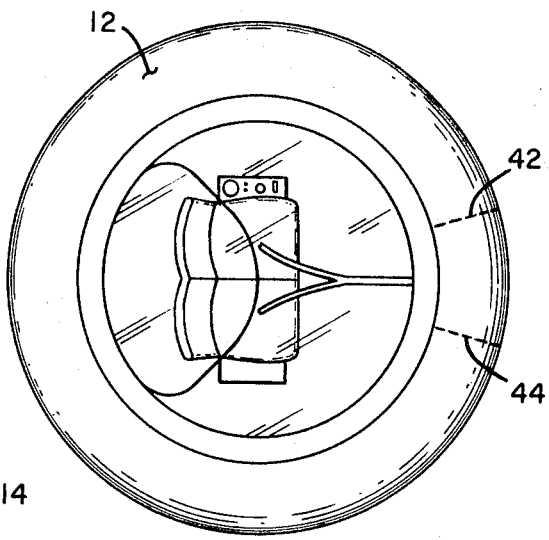
FIG. 2 is a top plan view of the vehicle shown in FIG. 1.

Referring first to FIGS. 1 and 2, the air cushion vehicle of this invention will be described. The vehicle, shown generally by numeral 10, comprises a platform 12 formed from sheet metal, fiberglass or some other suitable material. The base or platform 12 is preferably 7 to 9 feet in diameter and is turned downwardly at its peripheral edge 14 to define a dishlike plenum or air chamber.

Because the air cushion vehicle of this invention is designed to operate over land or water, it was found expedient to form a toroidal airtight chamber 16 by forming the platform as shown in the cross-sectional view in FIG. 1. This airtight chamber provides bouyancy, permitting the vehicle to float on water in the event that the power is turned off.

Located on the upper surface of platform 12 and beneath the operator's cabin 18 are a plurality of apertures (not shown). These apertures permit airflow through the upper surface of the platform and into the plenum defined by the toroidal chamber on the underside of the platform. The operator's cabin itself is supported by a mounting ring 19 which is perforated at regular intervals with holes 20 which permits air to be drawn in under the operator's cabin and then through the apertures in the platform 12.

Supported by the mounting ring 19 is the cabin deck 21. On the cabin deck 21 is a seat 22 for the operator and one passenger. The seat 22 forms a cover or shroud for a motor (not shown). The seat is suitably hinged to permit it to be tilted to expose the motor for maintenance and repair purposes.

Also mounted on the upper surface of the cabin deck 21 is a three-part enclosure which, when assembled, serves to protect the operator from dust, spray, and the elements. This enclosure includes a lower detachable truncated cone-shaped body portion 24 which is secured to the deck number 21. A molded cone-shaped member 25 having a rounded top is formed from a suitable transparent plastic and serves as a windshield and is detachably fastened by a means (not shown) to the upper edge of the body member 24. Completing the enclosure, is a removable entrance door 26 which also is preferably formed from a transparent material to provide increased visibility in all directions.

Mounted below the platform 12 but within the plenum defined by the toroidal chamber 16 is a fan or propeller 28 which is journaled through the platform 12 and operatively connected to the power shaft of the motor (not shown). It has been found that a 15 to 25 HP motor is adequate for excellent performance. As in all air cushion vehicles of the type described, the fan 28 serves to draw air through the ports 20 in the mounting ring 19 and through ports (not shown) in the platform 12 to significantly increase the air pressure within the dishlike plenum defined by the toroidal chamber 16. A typical fan size may be in the range of 4 to 6 feet. By controlling the speed of rotation of the fan 28 the vehicle can be made to fly approximately 2 to 4 inches above the surface of the earth.

Also housed beneath the platform 12 but within the area defined by the toroidal chamber 16 are a plurality of vanes including a first set 30 and a second set 32 which are disposed one above the other in a gridlike pattern when viewed from the top. The arrangement of the vanes is best shown in the perspective view of FIG. 3 which illustrates the control structure with the remaining portion of the vehicle removed. The control structure includes the operator's control lever 34 which is supported by a ball joint at 36 to permit the lower end thereof 38 to move in a circular path when the operator moves the upper end 40 to steer the craft. The ball joint 36 is journaled in the platform 12.

As shown in FIGS. 1 and 2, the control lever 34 and other portions of the control structure occupy a portion of the toroidal airtight chamber 16. This is accomplished by sealing the chamber at 42 and 44 and cutting away the portion of the shroud which is folded back upon itself thereby allowing room in which the control structure may operate.

The direction of movement of the vehicle is controlled by positioning the sets of vanes 30 and 32. The set 30 permits rotation of the vehicle about a vertical axis for turning purposes while the set 32 control movement in the forward or reverse direction. Each of the vanes in the set 32 are pivotally mounted in the shroud by pins 46 so as to be substantially parallel to one another and to permit them to be tilted in unison at a desired angle. The tilting of the vanes in set 32 is accomplished by the forward-reverse control rod linkages 48 and 50 which pass through the vanes and are, in turn, pivotally mounted therein along a line which is displaced from the line of centers of the pivot points 46. Therefore, by moving the control rods back and forth, the angle of tilt of the vanes in set 32 can be controlled.

The positioning of rods 48 and 50 is controlled by operator's control lever 34. A crossmember 52 is connected by welding or by some suitable fastener to the control rods 48 and 50 at points 54 and 56, respectively. Slidably mounted on the crossmember 52 is a loose fitting T-shaped coupling 58 (FIG. 4) into which the operator's control lever 34 is inserted in a sliding or telescoping fashion. When the operator presses downwardly on the end 40 of the control lever 34 the forward-backward control rod linkages 48 and 50 are moved in a forward direction to thereby tilt the bottom edge of the vanes in set 32 in a forward direction. The air from the fan 28 is thereby deflected in a direction tending to cause the vehicle to move in a reverse direction. By pushing forward and upward on the operator's control lever 34 the linkages 48 and 50 are moved towards the rear of the vehicle causing the bottom edge of the vanes in set 32 to be pointed towards the rear. This, in turn, causes the air from the fan 28 to be deflected in a direction urging the vehicle to move in a forward direction.

The craft can be made to turn 360° in either a clockwise or counterclockwise direction by means of the vanes in set 30. It is to be noted that the vanes in set 30 are split into two sections, namely a rear section 60 and a forward section 62. While only two vanes are shown in set 30, it is, of course, possible to add additional vanes to the set to provide a higher degree of directivity to the airflow from the fan 28.

Figure 3:
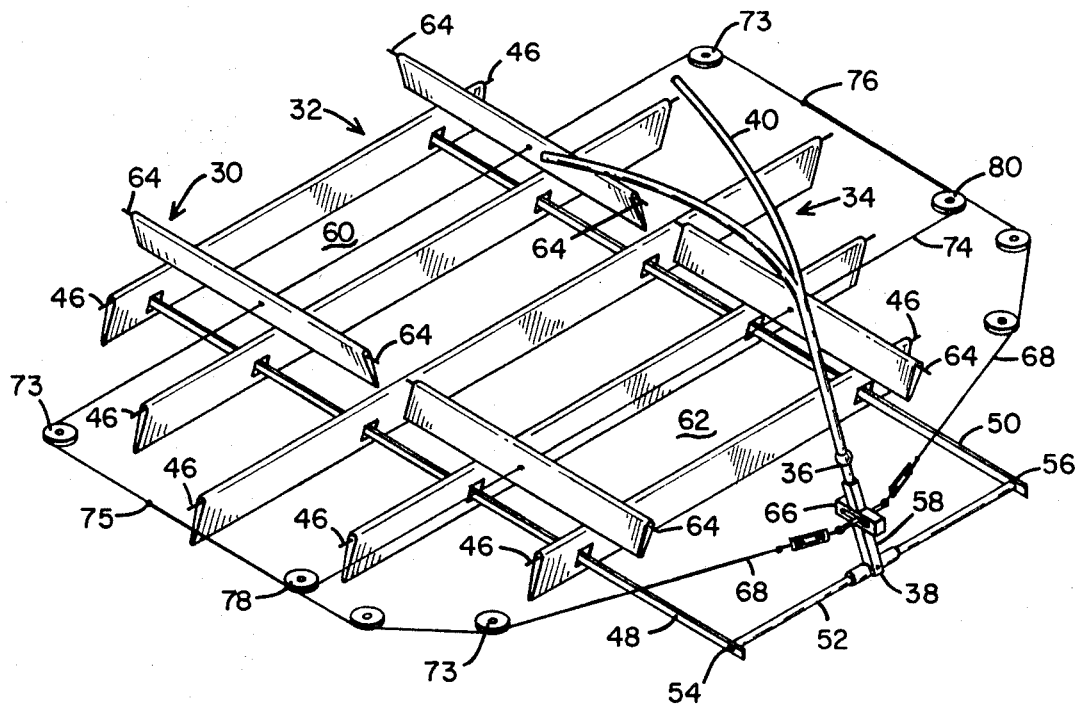
FIG. 3 is a perspective view of the control structure with the remainder of the vehicle removed for ease of viewing.
Figure 4:
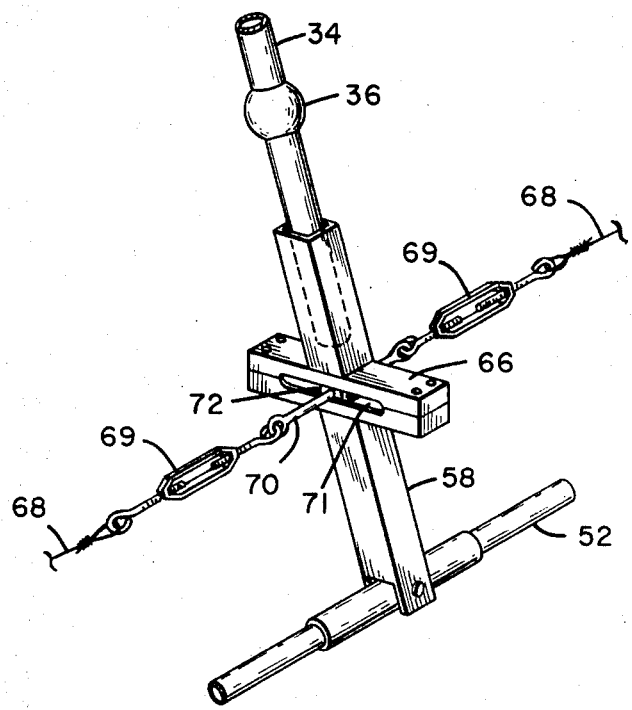
FIG. 4 is drawing showing the details of the slide block.

The vanes in set 30 are also pivotally mounted within the shroud defined by the toroidal chamber 16 by means of pins 64 so that they are free to rotate about a horizontal axis. The positioning of the vanes in set 30 is controlled by a cable and pulley arrangement, which is connected to the operator's control lever 34. More specifically, as is shown in FIGS. 3 and 4, the operator's control 34 has a slide block 66 welded thereto which extends in a horizontal plane parallel to the plane of the axis of rotation of the vanes in set 30. The ends of a cable 68 are secured to turnbuckles 69. The other end of the turnbuckles are connected to a connecting rod 70 which passes through the longitudinal slot 71 in the slide block 66. Contained within the slide block 66 and welded or otherwise rigidly affixed to the connecting rod 70 is a slide member 72 which is free to move longitudinally in the block 66 but constrained from movement in a transverse direction by abutting the sides of the slide block 66.

A plurality of pulleys 73 are provided for routing the cable 68 in the desired manner. The cable 68 controls the positioning of the vanes in rear section 60. A second cable segment 74 which is clamped to cable 68 at points 75 and 76 and which passes around the pulleys 78 and 80 along with the cable 68, controls the positioning of the vanes in front section 62 of set 30.

It will be noted that when the operator's control lever 34 is moved to the right by the operator, the portion of the control rod below the ball joint 36 will slide to the left along the cross-member 52 and tension will be applied to the cable 68 tending to move the lower edge of the vanes in section 60 of set 30 to the right. At the same time, the tension in the cable 74 will be such as to cause the bottom edge of the vanes in sections 62 in set 30 to move to the left. Thus, the air from the fan 28 will be deflected in such a way to cause the vehicle to rotate in a clockwise direction.

In a similar manner, when the operator moves the control lever 34 to his left the cable 68 is pulled in a direction causing the vanes in section 60 of set 30 to have their lower edge moved toward the left. At the same time, cable segment 72 is moved in a direction causing the lower edge of the vanes in section 62 of set 30 to be moved to the right. The air from the fan 28 will therefore be deflected in a direction tending to cause the vehicle to rotate about its centerline in a counterclockwise direction.

Thus, it can be seen that by properly positioning the control lever 34 an operator can cause the vehicle to move in a forward and backward direction as well as to rotate in a clockwise or counterclockwise direction. Also, by properly positioning the control lever 34 so that the vanes in both sets 30 and 32 are vertical, the craft will hover over a given point.

It is therefore, readily seen that the present invention provides an air cushion vehicle of simple construction and control. This is to be compared to prior art vehicles of the same type which are generally complex in design and require a complex control mechanism.

I claim:

1. An air cushion vehicle comprising:
    a circular shaped platform member having its periphery bent downwardly to define a dishlike chamber;
    a plurality of apertures in said platform disposed in a pattern for permitting the flow of air therethrough;
    a fan member located beneath said platform within the dishlike chamber and rotatable about a vertical axis passing through said platform for drawing air into said chamber to increase the air pressure beneath said platform;
    motor means mounted on the upper surface of said platform and operatively connected to drive said fan at controlled speeds;
    first and second sets of vane members formed in a grid with the individual vane members pivotably mounted beneath said fan and within said dishlike chamber;
    an operator's control lever passing through said platform pivotally mounted intermediate the extremities thereof to permit rotation of said lever about said pivot in four directions;
    a pair of vane linkage rods passing through said first set of vanes in said grid and adapted to rotate said first set in unison about said pivotal mounting when said control lever is rotated in first and second of said four directions;
    a plurality of pulleys vertically mounted on the bottom surface of said platform,
    cable means passing around said pulleys connected to the second set of vanes in said grid and to said control lever, adapted to rotate said second set of vanes in unison about said pivotal mounting when said control lever is rotated in third and fourth of said four directions.

2. Apparatus as in claim 1, wherein said second set of vane members is split into first and second sections and wherein said cable is arranged to move said first and second sections in opposite direction upon movement of said control lever in said third and fourth of said directions.